United States Patent [19]

Gallo et al.

[11] Patent Number: 4,822,062
[45] Date of Patent: Apr. 18, 1989

[54] TWO MATERIAL NON-ASBESTOS GASKET AND METHOD OF MAKING THE SAME

[75] Inventors: Paul E. Gallo, Berwyn; James H. Larsen, Brookfield; Mary K. Jurczyk, Berwyn, all of Ill.

[73] Assignee: Dana Corporation, Toledo, Ohio

[21] Appl. No.: 136,985

[22] Filed: Dec. 23, 1987

[51] Int. Cl.⁴ .............................................. F16J 15/12
[52] U.S. Cl. ............................ 277/235 B; 277/1; 277/166; 277/235 A
[58] Field of Search ............... 277/235 B, DIG. 6, 1, 277/166, 232–234, 235 R, 235 A, 236

[56] References Cited

U.S. PATENT DOCUMENTS

| | | |
|---|---|---|
| 622,889 | 4/1899 | Forsyth . |
| 1,241,587 | 10/1917 | Victor . |
| 1,997,987 | 4/1935 | Victor ........................ 277/235 B X |
| 2,029,302 | 2/1936 | Balfe .......................... 277/235 B X |
| 2,084,054 | 6/1937 | Balfe .......................... 277/235 B X |
| 3,532,349 | 10/1970 | Czernik ....................... 277/235 B X |
| 4,223,897 | 9/1980 | Staab et al. .................... 277/235 B |
| 4,402,518 | 9/1983 | Locacius . |
| 4,500,100 | 2/1985 | Bindel et al. . |
| 4,614,554 | 9/1986 | Bate et al. .................... 277/235 B X |
| 4,723,783 | 2/1988 | Belter et al. .................... 277/234 X |
| 4,776,602 | 10/1988 | Gallo ............................ 277/233 X |

FOREIGN PATENT DOCUMENTS

| | | | |
|---|---|---|---|
| 713262 | 11/1941 | Fed. Rep. of Germany ... | 277/235 B |
| 790016 | 9/1935 | France ........................... | 277/235 B |
| 639235 | 5/1962 | Italy ............................. | 277/235 B |
| 59-180164 | 10/1984 | Japan ............................ | 277/235 B |

*Primary Examiner*—Robert S. Ward
*Attorney, Agent, or Firm*—Marshall & Melhorn

[57] ABSTRACT

A gasket formed from a perforated core sheet having a first facing layer formed from a material having a relatively high degree of thermal conductivity on one side thereof and a second facing layer formed from a relatively compressible, non-asbestos gasket material on an opposite side thereof. The facing layers are attached to the core by mechanical retaining means. The retaining means can be formed as a pair of opposed tangs on opposite sides of each perforation in the core or as a dome-shaped structure having an aperture formed in an end thereof.

17 Claims, 1 Drawing Sheet

TWO MATERIAL NON-ASBESTOS GASKET AND METHOD OF MAKING THE SAME

BACKGROUND OF THE INVENTION

The present invention relates to a gasket in general and, in particular, to a cylinder head gasket and a method of manufacturing such a gasket.

In a known method of manufacture of cylinder head gaskets, sheets of soft material such as asbestos fibers are combined with synthetic rubber and rolled on both sides of a metal carrier sheet. The sheets of soft material are impregnated with polymer impregnating means for improvement of their durability with respect to cooling and lubricating and, also, to provide a seal along the edges of the gasket after openings to the combustion chamber have been formed and provided with metallic rim borders. Furthermore, the surfaces of the cylinder head gasket are provided with a coating layer so as to improve the microseal on the sealing surfaces and to eliminate the natural tendency of asbestos to adhere to the respective opposite metallic surfaces of the cylinder head and the engine block.

The manufacture of such known cylinder head gaskets is not only relatively expensive, but it leads in some situations to objectionable results. Most known impregnating means have undesirable features relating to the durability of the soft material. Therefore, with respect to any durable gas seal below the rim borders surrounding the combustion chamber openings, complicated measures are resorted to in order to prevent as much as possible penetration of the impregnating means below the border rims. The surface coating which serves to microseal the gasket surfaces not only requires an additional manufacturing step, it also results in groove-like traces of wear on the metallic rim borders. Since, during operation of an engine, the cylinder head and the engine block execute relative movement with respect to one another in the sealing plane, the surface having grooves extending onto the rim borders parallel to the sealing plane results in the gas seal being impaired along the combustion chamber openings.

Recent developments in vehicle engines have resulted in bi-metallic and all-aluminum blocks and heads. Such engines tend to require head gaskets having increased heat conductivity and, due to higher torques utilized on the head bolts, increased crushed resistance and increased resistance to loss of torque on the head bolts.

SUMMARY OF THE INVENTION

The present invention concerns a head gasket utilizing a perforated metal core having a facing sheet with a relatively high degree of thermal conductivity on one side and a facing sheet being formed of relatively compressible material on the opposite side. The sheets are mechanically clinched together, each sheet being of a selected thickness and density according to the application, with either side being the side facing the block while the opposite side faces the head. The relatively high thermal conductivity material can be an expanded graphite material. The relatively compressible material can be a commercially available non-asbestos gasket material which also can be coated with a resilient sealing material. For a gasket of a predetermined thickness, an increase in the thickness of the expanded graphite will tend to increase the thermal conductivity, and an increase in the thickness of the relatively compressible material will tend to increase torque retention for the head bolts.

It is an object of the present invention to provide a vehicle engine head gasket of increased thermal conductivity.

It is another object of the present invention to provide a vehicle engine head gasket having increased head bolt torque retention properties.

It is a further object of the present invention to provide a vehicle engine head gasket which is economical to the manufacturer.

DESCRIPTION OF THE PREFERRED EMBODIMENT

Figure 1:
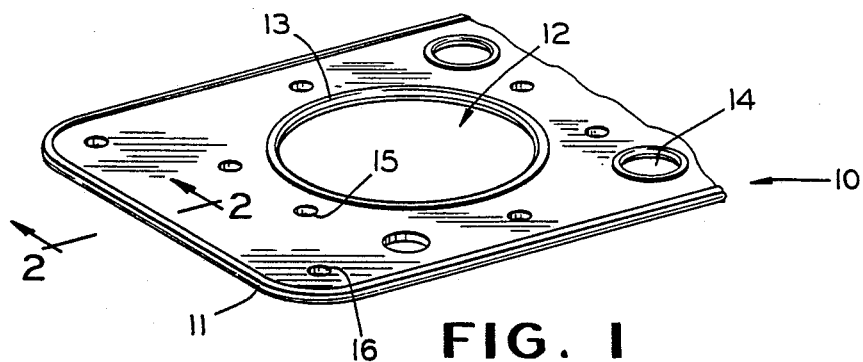
FIG. 1 is a fragmentary perspective view a head gasket embodying the present invention.
Figure 2:
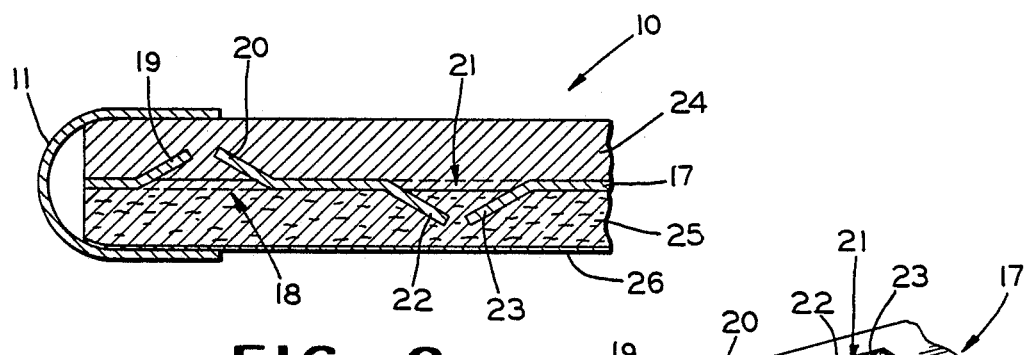
FIG. 2 is a cross-sectional view taken along the line 2—2 in FIG. 1 and enlarged.

There is shown in FIGS. 1 and 2, a gasket 10 in the form of a head gasket for a vehicle engine. Typically, a peripheral edge of the gasket 10 is enclosed in a flange 11 having a C-shape in cross-section and typically being formed of a metal material. Larger apertures 12 are formed in a central portion of the gasket 10 corresponding to the area in the block where the cylinders are formed and the combustion chamber and valve seat areas in the head of the engine. The opening 12 is typically provided with an encircling flange 13. Additional smaller apertures are provided such as an aperture 14 interconnecting water passages in the head and block, an aperture 15 connecting oil passages in the head and block, and an aperture 16 for the passage of a head bolt which is threaded into the block. Each of the passages 14, 15 and 16 can be encircled by a metallic flange element as desired.

The gasket 10 includes a metallic core element 17. The core element 17 is in the form of a metallic sheet having a retaining means such as a plurality of perforations formed therein. For example, a first perforation 18 is formed by splitting the metal and bending opposite sides of the perforation 18 in an upwardly extending direction to form tangs 19 and 20. Similarly, another perforation 21 can be formed having tangs 22 and 23 extending in a generally downward direction.

Figure 3:
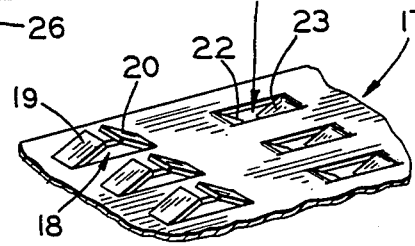
FIG. 3 is a fragmentary perspective view of the core of the gasket shown in FIG. 2.

The gasket 10 is provided with a first facing layer 24 formed from a material having a relatively high degree of thermal conductivity such as expanded graphite. A second facing layer 25 is formed from a relatively compressible material and is positioned on the opposite side of the core 17 from the first facing layer 24. The second facing layer can be formed of a commercially available non-asbestos gasket material such as "Victopac 989" available from the Victor Products Division of Dana Corportion. The facing layers 24 and 25 are mechanically clinched to the core 17 such that the tangs 19 and 20 engage the first facing layer 24 and the tangs 22 and 23 engage the second facing layer 25 to mechanically retain the facing layers 24 and 25 adjacent the core 17. The perforations and the tangs are shown in more detail in FIG. 3 and can be formed in any desired pattern such as alternating rows. In addition, an outer surface of the second facing layer 25 can be coated with a resilient sealing material 26 to assist in sealing against an adjacent metal surface such as a head or a block.

Figure 4:
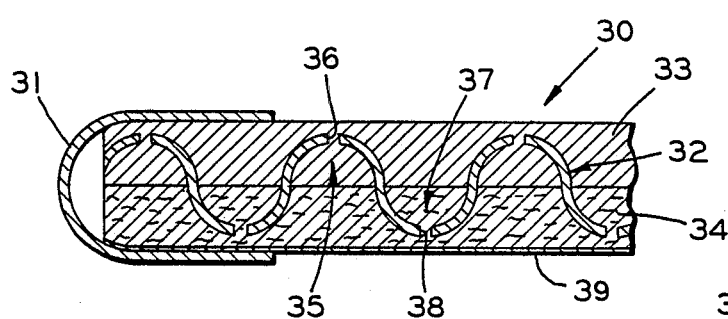
FIG. 4 is a cross-sectional view of an alternate embodiment of the gasket shown in FIG. 1.
Figure 5:
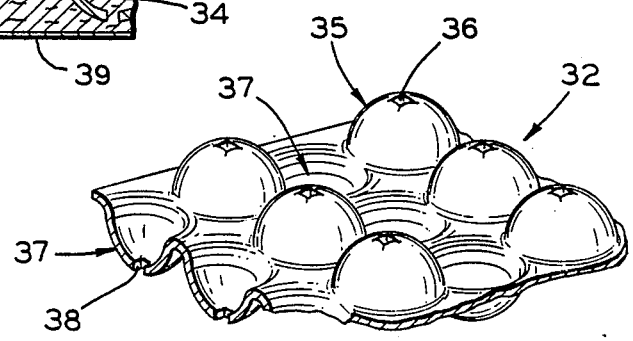
FIG. 5 is a fragmentary perspective view of the core of the gasket shown in FIG. 4.

An alternate embodiment of the gasket 10 is shown in FIGS. 4 and 5 as a gasket 30. The gasket 30 has a metallic flange 31 encircling its peripheral edge. The gasket 30 includes a perforated metal core 32, a first facing layer 33 of relatively high thermal conductivity on one side of the core and a second facing layer 34 of relatively compressible material on an opposite side of the core. The core 32 is typically formed from a sheet of metal material and has a retaining means such as a plurality of dome shaped perforations formed therein. For example, an upwardly extending dome shaped perforation 35 is formed such that the metal stretches and tears forming an aperture 36. Similarly an adjacent downwardly extending dome shaped perforation 37 is formed having an aperture 38 formed therein. The perforations 35 and 37 extend into the layers 33 and 34 respectively and tend to clinch and retain the layers in abutting relationship to the core 32. In addition, the second facing layer 34 can have a coating layer 39 applied to an outer surface thereof, the coating layer formed of a resilient sealing material. The perforations and apertures are shown in more detail in FIG. 5 as a pattern of alternating rows.

The gasket according to the present invention is formed by providing a sheet of metallic material and perforating the metallic material, preferably in an alternating row pattern from opposite sides, to form a retaining means. A first facing layer formed from a material having a relatively high degree of thermal conductivity is positioned abutting one side of the core and a second facing layer formed from a relatively compressible material is positioned adjacent an opposite surface of the core. The first and second facing layers are then forced into engagement with the perforations such that the first and second layers are retained in abutting relationship to the core. A flange can be provided about the peripheral edge of the gasket. A plurality of apertures are formed in the gasket and each aperture can also be provided with a flange about its periphery. In addition, a resilient material can be applied to an outwardly facing surface of the second facing layer.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An improved gasket structure comprising:
   a first facing layer formed from a material having a relatively high degree of thermal conductivity;
   a second facing layer formed from a relatively compressible material; and
   a core having a plurality of retaining means formed thereon, said first and second facing layers being mechanically retained to opposite surfaces of said core by said retaining means.

2. A gasket structure according to claim 1 wherein said first facing layer is formed from an expanded graphite material.

3. A gasket structure according to claim 1 wherein said second facing layer is formed from Victopac 989 material.

4. A gasket structure according to claim 3 including a resilient sealing material applied to an outwardly facing surface of said second facing layer.

5. A gasket structure according to claim 1 wherein said perforated core sheet is formed from a metallic material.

6. A gasket structure according to claim 1 wherein said retaining means are formed as a plurality of perforations having a pair of tangs on opposite sides of each of said perforations.

7. A gasket structure according to claim 1 wherein said retaining means are formed as a dome-shaped perforation having an aperture formed in an end thereof.

8. An improved gasket structure comprising:
   a first facing layer formed from a material having a relatively high degree of thermal conductivity;
   a second facing layer formed from a relatively compressible material; and
   a metal core having a plurality of retaining means formed therein, a portion of said retaining means extending away from one surface of said core and another portion of said retaining means extending away from an opposite surface of said core, said retaining means mechanically retaining said first facing layer on said one surface and said second facing layer on said another surface.

9. A gasket structure according to claim 8 wherein said retaining means are each formed as a perforation having a pair of tangs on opposite sides thereof for engaging said first and second facing layers.

10. A gasket structure according to claim 8 wherein said retaining means are each formed as a dome shaped perforation with an aperture in an end thereof.

11. A gasket structure according to claim 8 wherein said second facing layer is formed from a non-asbestos gasket material.

12. A gasket structure according to claim 8 wherein said first facing layer is formed from an expanded graphite material and said second facing layer is formed from Victopac 989 material.

13. A method of forming a gasket structure comprising the steps of:
   a. providing a sheet of core material having a plurality of retaining means formed therein;
   b. positioning a first facing layer formed from a material having a relatively high degree of thermal conductivity on one surface of said core;
   c. positioning a second facing layer formed from a relatively compressible material on a surface of said core opposite said one surface; and
   d. mechanically engaging said first and second facing layers with said retaining means.

14. A method according to claim 13 including a step of applying a resilient sealing material to an outwardly facing surface of said second facing layer.

15. A method according to claim 13 wherein said step a. includes forming each said retaining means as a perforation having a pair of outwardly extending tangs.

16. A method according to claim 13 wherein said step a. includes forming each said retaining means as a dome shaped perforation having an aperture in an end thereof.

17. A method according to claim 13 wherein said step b. includes selecting a first thickness for said first facing layer and said step c. includes selecting a second thickness for said second facing layer, said first and second thicknesses being equal to a predetermined value

* * * * *